US012701184B2

(12) United States Patent
Merchant et al.

(10) Patent No.: US 12,701,184 B2
(45) Date of Patent: Aug. 4, 2026

(54) SYSTEMS AND METHODS FOR JIP AND CLLI MATCHING IN TELECOMMUNICATIONS METADATA AND MACHINE-LEARNING

(71) Applicant: Pindrop Security, Inc., Atlanta, GA (US)

(72) Inventors: Mohammed Ali Merchant, New York, NY (US); Yitao Sun, New York, NY (US)

(73) Assignee: Pindrop Security, Inc., Atlanta, GA (US)

( * ) Notice: Subject to any disclaimer, the term of this patent is extended or adjusted under 35 U.S.C. 154(b) by 758 days.

(21) Appl. No.: 18/109,095

(22) Filed: Feb. 13, 2023

(65) Prior Publication Data

US 2023/0262161 A1 Aug. 17, 2023

Related U.S. Application Data

(60) Provisional application No. 63/310,178, filed on Feb. 15, 2022.

(51) Int. Cl.
*H04M 3/42* (2006.01)
*H04M 3/22* (2006.01)

(52) U.S. Cl.
CPC ..... *H04M 3/42059* (2013.01); *H04M 3/2281* (2013.01); *H04M 3/42357* (2013.01); *H04M 2203/6027* (2013.01)

(58) Field of Classification Search
CPC ........... H04M 3/42059; H04M 3/2281; H04M 3/42357; H04M 2203/6027; H04M 2203/551; H04M 3/436; H04M 2203/556
See application file for complete search history.

(56) References Cited

U.S. PATENT DOCUMENTS

| | | | | |
|---|---|---|---|---|
| 8,848,887 | B2 * | 9/2014 | Willman | H04M 15/80 |
| | | | | 370/352 |
| 9,961,198 | B2 * | 5/2018 | Spievak | H04M 3/436 |
| 10,938,982 | B1 * | 3/2021 | Merchant | H04M 3/2281 |
| 11,461,805 | B2 * | 10/2022 | Kuskey | H04M 3/5158 |
| 11,611,652 | B2 * | 3/2023 | Merchant | H04M 3/42306 |
| 11,889,024 | B2 * | 1/2024 | Cornwell | H04M 3/5175 |
| 12,022,024 | B2 * | 6/2024 | Casal | G06N 20/00 |
| 12,113,930 | B2 * | 10/2024 | Zhao | H04M 15/00 |
| 12,120,263 | B2 * | 10/2024 | Merchant | H04M 3/2281 |

(Continued)

*Primary Examiner* — Lisa Hashem
(74) *Attorney, Agent, or Firm* — Foley & Lardner LLP

(57) ABSTRACT

Embodiments described herein provide for systems and methods for verifying authentic JIPs associated with ANIs using CLLIs known to be associated with the ANIs, allowing a computer to authenticate calls using the verified JIPs, among various factors. The computer builds a trust model for JIPs by correlating unique CLLIs to JIPs. A malicious actor might spoof numerous ANIs mapped to a single CLLI, but the malicious actor is unlikely to spoof multiple CLLIs due to the complexity of spoofing the volumes of ANIs associated with multiple CLLIs, so the CLLIs can be trusted when determining whether a JIP is authentic. The computer identifies an authentic JIP when the trust model indicates that a number of CLLIs associated with the JIP satisfies one or more thresholds. A machine-learning architecture references the fact that the JIP is authentic as an authentication factor for downstream call authentication functions.

20 Claims, 3 Drawing Sheets

(56) References Cited

U.S. PATENT DOCUMENTS

| | | | | |
|---|---|---|---|---|
| 12,250,344 B2 * | 3/2025 | Cornwell | .......... | H04M 3/42059 |
| 12,432,299 B2 * | 9/2025 | Casal | ............... | H04M 3/42357 |
| 12,437,751 B2 * | 10/2025 | Phatak | .................. | G10L 15/063 |
| 2019/0037081 A1 * | 1/2019 | Rao | ..................... | H04M 3/5175 |
| 2020/0322483 A1 * | 10/2020 | Anand | .................. | H04M 1/663 |
| 2025/0039295 A1 * | 1/2025 | Merchant | .......... | H04M 3/42059 |
| 2025/0159080 A1 * | 5/2025 | Cornwell | .......... | H04M 3/42059 |
| 2025/0168274 A1 * | 5/2025 | Filart | ............... | H04M 3/42059 |

* cited by examiner

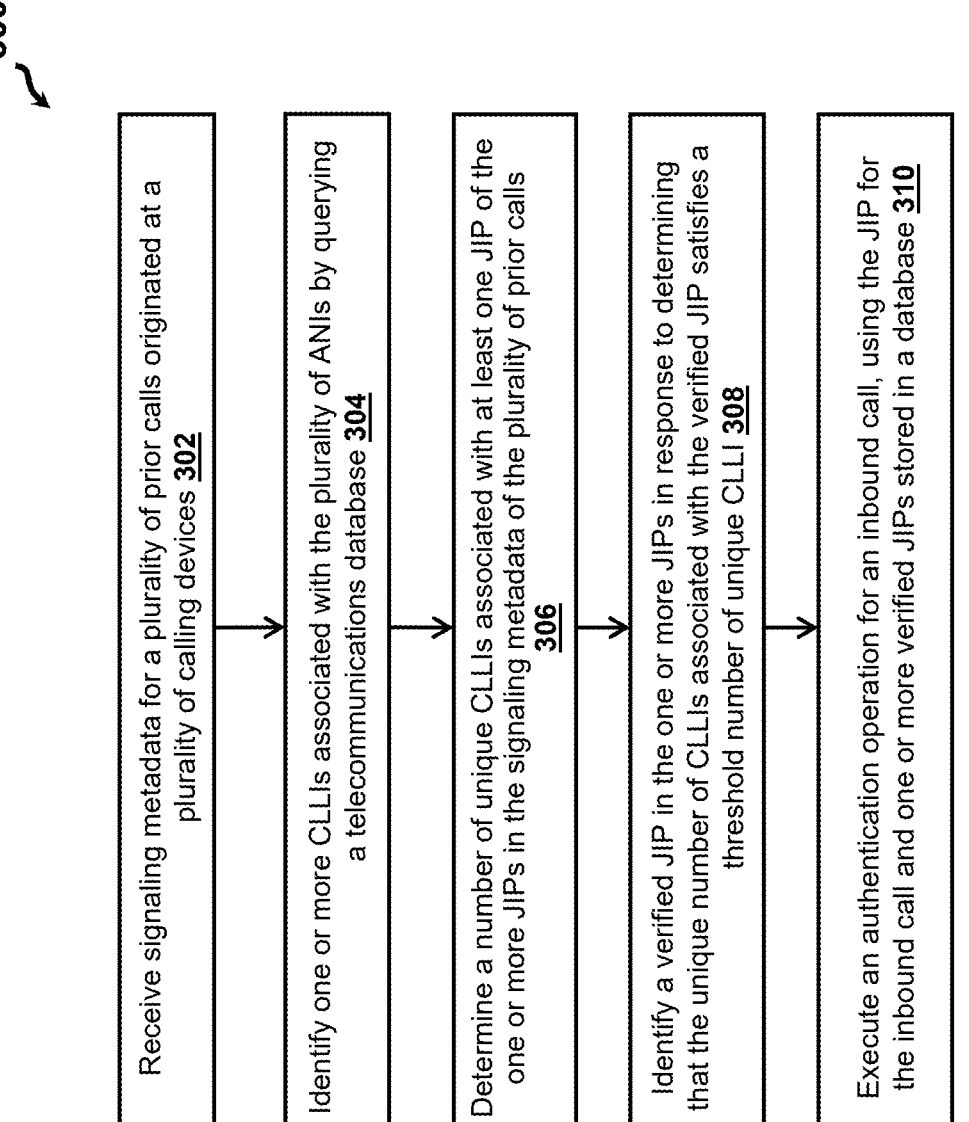

*300*

Receive signaling metadata for a plurality of prior calls originated at a plurality of calling devices 302

Identify one or more CLLIs associated with the plurality of ANIs by querying a telecommunications database 304

Determine a number of unique CLLIs associated with at least one JIP of the one or more JIPs in the signaling metadata of the plurality of prior calls 306

Identify a verified JIP in the one or more JIPs in response to determining that the unique number of CLLIs associated with the verified JIP satisfies a threshold number of unique CLLI 308

Execute an authentication operation for an inbound call, using the JIP for the inbound call and one or more verified JIPs stored in a database 310

*FIG. 3*

SYSTEMS AND METHODS FOR JIP AND CLLI MATCHING IN TELECOMMUNICATIONS METADATA AND MACHINE-LEARNING

CROSS-REFERENCE TO RELATED APPLICATION

This application claims priority to U.S. Provisional Application No. 63/310,178, filed Feb. 15, 2022, which is incorporated by reference in its entirety.

This application relates to U.S. patent application Ser. No. 16/992,789, entitled "Caller Verification via Carrier Metadata," filed Aug. 13, 2020, which is incorporated by reference in its entirety.

TECHNICAL FIELD

This application generally relates to systems and methods for intelligent, automated detection of fraudulent or spoofed telephone calls and automated generation of models for such detection processes.

BACKGROUND

Spoofing techniques, such as Caller ID spoofing and voice spoofing, can cause problems for enterprise call centers trying to maintain privacy by circumventing technological controls protecting customers' personal information. Call centers or third-party authentication services typically reference known information about customers (e.g., customer phone number, automatic number identification (ANI) of the customer) or customer attributes (e.g., voice attributes) to verify that a caller is a registered customer. Spoofing frustrates the enterprise's ability to leverage the stored knowledge about customers (e.g., stored customer ANI) with confidence. It would be beneficial to develop anti-fraud or call verification processes that are not susceptible to spoofed or manipulated data associated with phone calls.

SUMMARY

What is needed is a means of authenticating callers and caller devices. In particular, what is needed is a means for capturing identifying information about caller devices, where the information about the devices operates as a factor of authentication when authenticating calls.

Disclosed herein are systems and methods capable of authenticating a call using call data that may conventionally be unreliable. An illustrative system disclosed herein may be used in real time as a call is coming into a call center (e.g., an inbound call). An analytics server builds a database of trusted Jurisdiction Information Parameters (JIPs) using Common Language Location Identifiers Code (CLLIs) associated with ANIs. For each inbound call, the analytics server evaluates whether the JIP associated with the ANI received as part of the call data is verified. The analytics server uses the verified JIP as an authentication factor in evaluating whether the inbound call is an authentic inbound call.

In an embodiment, a computer-implemented method may comprise receiving, by a computer, signaling metadata for a plurality of prior calls originated at a plurality of calling devices, the signaling metadata for each of the plurality of prior calls including an Automated Number Identifications (ANI) and a Jurisdiction Information Parameter (JIP); identifying, by the computer, a Common Language Location Identifier Code (CLLI) associated with each ANI by querying a telecommunications database using the ANI; determining, by the computer, a number of unique CLLIs associated with each JIP in the signaling metadata of the plurality of prior calls; identifying, by the computer, a verified JIP in the signaling metadata of the plurality of prior calls in response to determining that the number of unique CLLIs associated with the verified JIP satisfies a threshold number of unique CLLIs; and executing, by the computer, an authentication operation for an inbound call, using a JIP in signaling metadata of the inbound call and one or more verified JIPs stored in a database.

In another embodiment, a system may comprise a computing device comprising a processor and a non-transitory storage medium configured to store a plurality of computer program instructions that when executed by the processor: receive signaling metadata for a plurality of prior calls originated at a plurality of calling devices, the signaling metadata for each of the plurality of prior calls including an Automated Number Identifications (ANI) and a Jurisdiction Information Parameter (JIP); identify a Common Language Location Identifier Code (CLLI) associated with each ANI by querying a telecommunications database using the ANI; determine a number of unique CLLIs associated with each JIP in the signaling metadata of the plurality of prior calls; identify a verified JIP in the signaling metadata of the plurality of prior calls in response to determining that the number of unique CLLIs associated with the verified JIP satisfies a threshold number of unique CLLIs; and execute an authentication operation for an inbound call, using a JIP in signaling metadata of the inbound call and one or more verified JIPs stored in a database.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 3 shows execution steps of an illustrative method for authenticating an inbound call, according to an embodiment.

DETAILED DESCRIPTION

Figure 1:
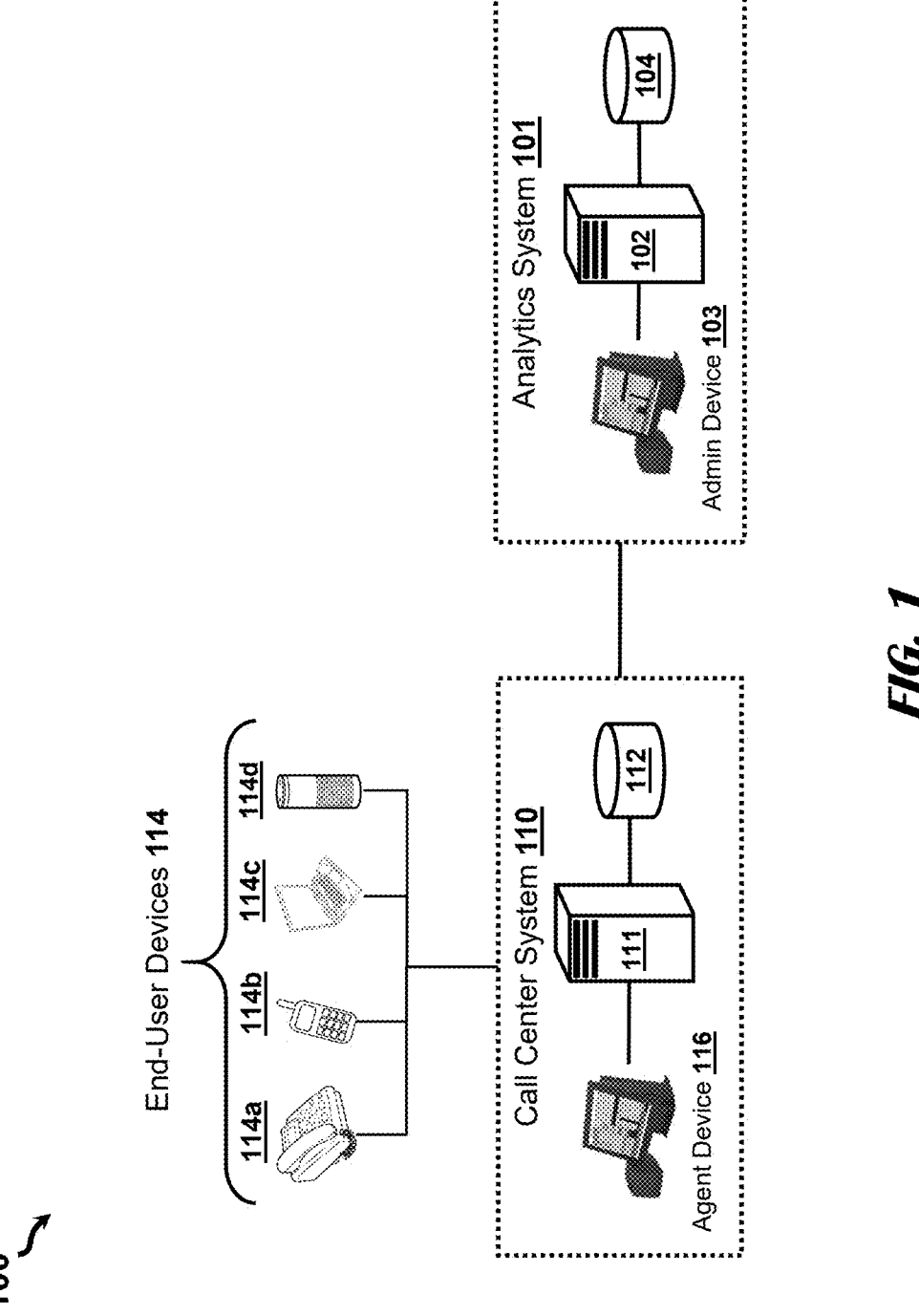
FIG. 1 shows components of a system for receiving and servicing inbound calls, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

A JIP is an identifier assigned to a telecommunications carrier (or network carrier) and used to indicate a geographic service area of that carrier. JIPs are commonly received by a call center in call data, often in the form of call signaling data. However, JIPs are not trustworthy as JIPs can be injected into the signaling data at various points in routing a call, making the call appear is if the call is originating from a different geographic location. The coverage area of a geographic area identified by a JIP may be subdivided into common language location identifiers (CLLIs) assigned to telecommunications/network carriers. Various CLLIs are mapped to a single JIP to indicate a coverage of the geographic area identified by the JIP. CLLIs are assigned by telecommunication carriers (or other network providers) to numerous ANIs.

Spoofed calls are frequently made to companies that handle personal or financial information, such as banks, credit card companies, and retail stores. A spoofed call is therefore used to mask an identity, or assume the identity of a legitimate consumer-caller. However, there is signaling information and metadata associated with a call that is much harder to alter. The embodiments described herein develop and use more assured signaling information to detect spoofed calls, thereby authenticating each inbound call with more confidence.

Embodiments disclosed herein includes systems and methods for assessing a risk associated with, or authenticating, inbound calls made to call centers using various types of signaling information. The embodiments analyze, for example, relationships between JIPs, CLLIs, or other types of signaling metadata. The systems and methods determine the riskiness and/or authenticate calls using various factors, which may include evaluating the JIP and CLLI, and identifying whether a JIP is an authenticated JIP.

Conventional approaches to evaluating fraud risk or authenticating for calls previously considered the JIP of a call. However, those conventional approaches simply accepted a purported JIP at face value, as received in the signaling information. Those prior approaches then performed the evaluations using purported JIP. As mentioned, a problem with simply taking the purported JIP as received is that the JIP is an injectable data field, such that an actor (e.g., carrier, bad actor) may inject an arbitrary value for the JIP somewhere along a telecommunications path. For example, some carrier device could inject the carrier's own value for the JIP. This may occur in the absence of an originating carrier specifying the JIP. Accordingly, the received JIP received as part of the call data may not be representative of the geographic location of the originating caller and is therefore unreliable in authenticating calls. The possibility of receiving an arbitrary JIP value, injected into the signaling metadata by some actor in the path, effectively dilutes the utility of the conventional approaches that evaluated the JIP as received.

The embodiments described herein reference the JIP for fraud risk detection and authentication. The embodiments further verify the JIP using additional factors, such as the CLLI of the caller ANI or evaluating location information associated with the calling device. By bringing in the CLLI to verify the JIP, the embodiments evaluate (or bolster) the reputability and trustworthiness of the purported JIP, allowing the called system to predict distinctions between verified JIPs and injected JIPs. Conventional approaches do not, for example, analyze and evaluate the reputability of the JIP received as part of the call data using other factors (e.g., CLLI) when detecting fraud or authenticating calls. The systems and methods herein apply a machine-learning architecture that, for example, verifies a purported JIP using CLLI information, and then predicts fraud likelihood or authenticates the caller using, for example, a verified JIP and location information, among other types of signaling metadata or caller information.

Embodiments described herein build a trust model for JIPs based on correlating unique CLLIs to JIPs. While a malicious actor may spoof numerous ANIs mapped to a single CLLI, there is a reduced likelihood of the malicious actor spoofing multiple CLLIs due to the sheer number of resources required to spoof the number of ANIs associated with multiple CLLIs. The embodiments described here determine that a JIP is authenticated (authorized, verified, etc.) when the trust model indicates that a number of CLLIs associated with the JIP satisfies one or more thresholds. Subsequently, the system may use the JIP as an authentication factor during call authentication. For example, one or more machine-learning architectures may receive the JIP as an input authenticating the inbound call.

A machine-learning architecture includes software programming executed by one or more computing devices. The software code includes various layers or functions defining the machine-learning architecture. As an example, the machine-learning architecture may include any number of input layers, statistical layers, and output layers, among others. Embodiments may one or more machine-learning architectures, where the layers or functions define disparate machine-learning architectures or a sequence of machine-learning architectures organized as an integrated machine-learning architecture. Moreover, the statistical layers may include various types of machine-learning models programmed (and trained) to implement machine-learning techniques that model certain types of information, such as a location model or risk likelihood model. These models may implement any number of machine-learning techniques. As an example, in some embodiments, a location model implements a machine-learning technique (e.g., Bayesian model, random forest, neural network) trained to predict the likelihood of receiving a purported JIP for a given CLLI or location. In some cases, a machine-learning model in the layers of the machine-learning architecture implements an ensemble model, defined by a plurality of constituent models trained to generate the predicted outcome in concert. As an example, the location model implements three constituent models, each of which implements distinct machine-learning techniques to predict the likelihood of receiving the purported JIP for the given CLLI or location. These are merely examples and not intended to limit potential embodiments of the machine-learning architecture(s) within the scope of this disclosure.

FIG. 1 shows components of a system 100 for receiving and servicing inbound calls according to an embodiment. The system 100 comprises an analytics system 101, call center systems 110 of customer enterprises (e.g., companies, government entities, universities), and end-user devices 114. The analytics system 101 includes analytics server 102, analytics database 104, and admin device 103. The call center system 110 includes call center servers 111, call center databases 112, and agent device 116. The system 100 describes an embodiment of call authentication performed by the analytics system 101 on behalf of the call center system 110.

Embodiments may comprise additional or alternative components or omit certain components from those of FIG. 1, and still fall within the scope of this disclosure. It may be common, for example, for the system 100 to include multiple call center systems 110 or for the analytics system 101 to have multiple analytics servers 102. Embodiments may include or otherwise implement any number of devices capable of performing the various features and tasks described herein. For example, the FIG. 1 shows the analytics server 102 as a distinct computing device from the analytics database 104. In some embodiments, the analytics database 104 is integrated with the analytics server 102. FIG. 1 also shows a single analytics server 102, however the analytics server 102 may include any number of computing devices operating in a distributed computing environment, such as a cloud environment. In some embodiments, functions of the analytics server 102 may be partly or entirely performed by the computing devices of the call center system 110 (e.g., the call center server 111).

The various components of the system 100 are interconnected with each other through hardware and software components of one or more public or private networks. Non-limiting examples of such networks may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, the end-user devices 114 may communicate with callees (e.g., call center systems 110) via telephony and telecommunications protocols, hardware, and software capable of hosting, transporting, and exchanging audio data associated with telephone calls. Non-limiting examples of telecommunications hardware may include switches and trunks, among other additional or alternative hardware used for hosting, routing, or managing telephone calls, circuits, and signaling. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Components for telecommunications may be organized into or managed by various different entities, such as, for example, carriers, exchanges, and networks, among others.

The system 100 comprises various hardware and software components that capture and store various types of call data, including audio data or other signaling data related to the call received at the call center system 110. The call data may include, for example, audio data (e.g., audio recording, audio segments, low-level spectro-temporal features, acoustic features), caller information (e.g., an ANI, customer identifiers of customers of the call center system 110, caller name, caller address, etc.), and metadata (e.g., JIPs, CLLIs, protocol headers, device identifiers) related to particular software (e.g., Skype, codecs) and protocols (e.g., TCP/IP, SIP, SS7) used to execute the call via the particular communication channel (e.g., landline telecommunications, cellular telecommunications, Internet).

The end-user devices 114 may be any communications or computing device that the caller operates to access the services of the call center system 110 through the various communications channels. For instance, the end-user may place the call to the call center system 110 through a telephony network or through a software application executed by the end-user devices 114. Non-limiting examples of end-user devices 114 may include landline phones 114a, mobile phones 114b, calling computing devices 114c, or edge devices 114d. The landline phones 114a and mobile phones 114b are telecommunications-oriented devices (e.g., telephones) that communicate via telecommunications channels. The end-user devices 114, however, are not limited to the telecommunications-oriented devices or channels. For instance, in some cases, the mobile phones 114b may communicate via a computing network channel (e.g., the Internet). The end-user devices 114 may also include an electronic device comprising a processor and/or software, such as a calling computing device 114c or edge device 114d implementing, for example, voice-over-IP (VoIP) telecommunications, data streaming via a TCP/IP network, or other computing network channel. The edge device 114d may include any Internet of Things (IoT) device or other electronic device for computing network communications. The edge device 114d could be any smart device capable of executing software applications and/or performing voice interface operations. Non-limiting examples of the edge device 114d may include voice assistant devices, automobiles, smart appliances, and the like.

Generally, when a caller places the call to the call center system 110, the end-user device 114 instructs components of a telecommunication carrier system or other network routing system to originate and connect the current call to the call center system 110. When the inbound call is established between the end-user device 114 and the call center system 110, a computing device of the call center system 110, such as a call center server 111 or agent device 116 forwards the inbound call and any associated signaling metadata to the analytics system 101 via one or more computing networks.

The call center system 110 is operated by a particular enterprise to offer various services to the enterprise's end-users (e.g., customers, account holders). The call center system 110 includes a call center server 111 or other computing device that executes various operations related managing the inbound calls. These operations include receiving or generating various forms of call data, and forwarding the call data to the analytics system 101.

The call center server 111 of a call center system 110 executes software processes for managing a call queue and/or routing calls made to the call center system 110, which may include routing calls to the appropriate call center agent devices 116 based on the inbound caller's comments, instructions, interactive voice response (IVR) inputs, or other inputs submitted during the inbound call. The call center server 111 can capture, query, or generate various types of call data (e.g., audio data, audio recording, metadata, speaker inputs) about the call, the caller, and/or the end-user device 114 and forward the call data to the agent device 116, where an agent UI of the agent device 116 displays the call data to the call center agent.

The call center server 111 also transmits the captured, queried, or generated types of call data to the analytics system 101 to perform the various analytics processes on the call data of the inbound call or any prior call. The call center server 111 may transmit the call data to the analytics server 102 based upon a preconfigured triggering conditions (e.g., receiving the inbound phone call), instructions, or queries received from another device of the system 100 (e.g., agent device 116, admin device 103, analytics server 102), or as part of a batch transmitted at a regular interval or predetermined time.

The analytics database 104 and/or the call center database 112 may be hosted on any computing device (e.g., server, desktop computer) comprising hardware and software components capable of performing the various processes and tasks described herein, such as non-transitory machine-readable storage media and database management software (DBMS).

The analytics database 104 and/or call center database 112 may store data of prior call data, such as a record containing data for verified JIPs (sometimes referred to as a JIP record)

and CLLIs. The JIP record (or other form of database record containing call data) may include a lookup table of JIPs mapping to a corresponding status of the particular JIP (e.g., verified JIP, not verified JIP, low trust JIP, high trust JIP, etc.) and CLLIs associated with each JIP. While JIPs are included as part of the call data of each inbound call received by the call center system 110, CLLIs are codes published in a database that are associated with geographic locations. Accordingly, the analytics server 102 queries an external database (not shown) to access CLLIs corresponding to the ANI associated with the inbound call. The analytics database 104 and/or call center database 112 may store the CLLIs retrieved from the external database in a lookup table mapping the CLLIs to an ANI and/or JIP. In some embodiments, the analytics server 102 receives the CLLI as part of the call data (e.g. one or more other entities may map the CLLI to the ANI while routing the call) and the analytics server 102 may query the external database to verify the received CLLI.

The external database may be a third-party telephony service hosting a database, or is a company or other entity offering an administrative or overhead service of the nation-wide or global telecommunications system. The third-party telephony service may provide a directory or telecommunications data management service that hosts the external database storing a variety of types of data associated with any number of entities or people. The external database stores information about, for example, end-user devices 114, ANIs, JIPs, CLLIs, among other information about telecommunications systems and devices (e.g., switches, routers, exchanges, end-user devices 114). The analytics server 102 may query the external database according to information received from the end-user devices 114 during telephone calls such as an ANI received with the inbound call. The information retrieved by the external database may be, for example, various information known to be (by registration) or otherwise frequently associated with the ANI and/or JIP.

The analytics database 104 and/or call center database 112 may also store various thresholds used in evaluating whether a JIP is verified. In some embodiments, the analytics server 102 employs a global threshold to evaluate whether the JIP is verified. In other embodiments, the analytics server 102 employs regional thresholds and/or call-center specific thresholds to evaluate whether the JIP is verified and/or a particular call is authenticated.

The thresholds may be determined by agents of the call center system 110 using the agent device 116, administrators of the analytics system 101 using the admin device 103, and/or the analytics server 102. For example, agents of the call center system 110 using the agent device 116 and/or administrators of the analytics system 101 using the admin device 103 determine thresholds based on agent/admin experience, call center rules/guidelines, and/or some combination. Additionally or alternatively, the analytics server 102 determines thresholds based on prior call authentication and associated JIPs. For example, the analytics server 102 may utilize the JIP as a factor in call authentication processing even if the JIP is not authenticated. Over time, and in response to a determination of authenticated calls associated with the JIP that has not been authenticated, the analytics server 102 may decrease the threshold associated with authenticating that JIP (or alternatively, the analytics server 102 may decrease the thresholds associated with authenticating all JIPs—the global JIP threshold). The analytics server 102 may determine authenticated callers using other authentication factors and machine-learning architecture, as described herein.

The admin device 103 of the analytics system 101 is a computing device allowing personnel of the analytics system 101 to perform various administrative tasks or administrator prompted analytics operations. The admin device 103 may be any computing device comprising a processor and software, and capable of performing the various tasks and processes described herein. Non-limiting examples of the admin device 103 may include a server, personal computer, laptop computer, tablet computer, or the like. In operation, the administrator employs the admin device 103 to configure the operations of the various components of the analytics system 101 or call center system 110 and to issue queries and instructions to such components. In an example, an administrator using the admin device 103 determines one or more thresholds used in authenticating JIPs.

The agent device 116 of the call center system 110 may allow agents or other users of the call center system 110 to configure operations of devices of the call center system 110. The agent device 116 may be any computing device comprising a processor and software, and capable of performing the various tasks and processes described herein. Non-limiting examples of the agent device 116 may include a server, personal computer, laptop computer, tablet computer, or the like. For calls made to the call center system 110, the agent device 116 receives and displays via the agent UI some or all of the information associated with inbound call data, routed from the call center server 111 or from the analytics server 102. The agent UI further permits the agent to provide call authentication feedback to the analytics server 102.

An analytics service operates the analytics server 102 to perform various call analytics operations on behalf of the enterprise's call center system 110. The analytics operations include, for example, verifying JIPs and call authentication. An end user-facing enterprise organization (e.g., corporation, government entity, university) operates the call center system 110 to service calls or web-based interactions with the end users via the various communication channels. The analytics system 101 and the call center system 110 represent network infrastructures 101, 110 comprising physically and logically related software and electronic devices managed or operated by various enterprise organizations. The devices of each network system infrastructure 101, 110 are configured to provide the intended services.

The analytics server 102 of the call analytics system 101 may be any computing device comprising one or more processors and software, and capable of performing the various processes and tasks described herein. The analytics server 102 may host or be in communication with the analytics database 104, and receives and processes call data (e.g., audio recordings, metadata) received from the one or more call center systems 110.

The analytics server 102 executes data analysis and audio-processing software that includes machine-learning (or artificial intelligence) software routines to analyze the call data of the inbound call. Non-limiting examples of such audio-processing operations may include ingesting the inbound call (including pre-processing an input audio signal of the inbound call), automatic speaker verification (ASV), speaker recognition or verification, and generating enhanced audio signals for a certain targeted speaker, among any number of addition or alternative operations. Non-limiting examples of the pre-processing operations executed on the input audio signals include parsing or segmenting the input audio signal into frames or segments (e.g., speech segments of a given length, non-speech segments of a given length), performing one or more transformation functions (e.g., FFT, SFT), and extracting various types of features from the input audio signal, among other potential pre-processing operations.

For embodiments in which the analytics server 102 executes machine-learning algorithms, the analytics server 102 uses labeled data stored in the analytics database 104 or call center database 112 in order to train or otherwise generate one or more machine-learning architectures. Training and developing machine learning models in various operational phases is described in U.S. patent application Ser. No. 16/992,789, entitled "Caller Verification via Carrier Metadata," filed Aug. 13, 2020, which is incorporated by reference in its entirety. Labeled data may indicate which call data are associated with fraudulent calls and which are associated with non-fraudulent calls. The analytics server 102 may reference such labels when training machine-learning models.

The analytics server 102 may also generate and store probability data in an analytics database 104 using call data of past and/or current inbound calls, as received from, for example, customer call center systems 110 and/or other telecommunications systems. The analytics server 102 may use this probability data to generate a risk score (or other type of risk indicator) for a current inbound call 110, and in turn determine whether the risk score satisfies a threshold value, which may be a call verification value or a threat risk threshold.

In some embodiments, the probability data may include probability lookup tables. The analytics server 102 may use the metadata to generate probability lookup tables based upon correlations with the metadata in the call center database 112, analytics database 104 and/or a current call. For example, probability tables may represent a probability score that the JIP observed in the metadata of the inbound call has previously been authenticated and/or associated with a carrier (or ANI, or other type of signaling data) of the inbound call. In these cases, the probability data represents the risk score associated with the inbound call. Additionally or alternatively, in some embodiments the probability data generated by the analytics server 102 may include trained machine-learning models and/or feature vectors for particular JIPs, ANIs, or other identifiers associated with end-user device 114. In such cases, the analytics server 102 may generate probability values as features fed into a machine-learning architecture.

The analytics server 102 may generate or update probability data at, for example, a certain time interval, in response to one or more triggering events, in real-time as data or calls are received, or any combination of these options. As an example, the analytics server 102 may automatically generate or update probability data (e.g., lookup tables, feature vectors, trained machine-learning models) at any interval, such as, for example, every day, week, month, or year. As another example, the analytics server 102 may automatically generate or update probability data (e.g., lookup tables, feature vectors, trained machine-learning models) in response to a triggering event, such as, for example, an instruction of a user (e.g., administrative user via admin device 103, agent via agent device 116), or identifying a new fraudulent telephone call, among others. As another example, the analytics server 102 may automatically generate or update probability data (e.g., lookup tables, feature vectors, trained machine-learning models) in real-time when a call is received or at some other time point during the lifecycle of a current call. In the illustrative system 100, the analytics server 102 may store new or updated probability data into an analytics database 104, though the probability data may be stored on any computing device.

In operation, the analytics server 102 may execute various software-based processes that, for example, ingest call data (including metadata and an ANI) of telephone calls, query one or more databases 104, 112, or other external database, determine an authentication status of the metadata based on prior call data or prior calls, and determine a risk score of a current inbound call to a call center 110 using probability data based on prior call data of prior calls. In some embodiments, the metadata includes at least the JIP. In other embodiments, the metadata includes at least the JIP and the CLLI.

In response to receiving call data from the call center system 110, the analytics server 102 queries the analytics database 104 for a record of the JIP identified in the call data. Using the JIP record, the analytics server 102 determines a status indication associated with the JIP indicating whether the JIP is authenticated. The analytics server 102 determines the status indication by comparing the JIP identified in the call data to each of the JIPs in the call record. If the JIP is authenticated, the analytics server 102 uses the JIP as an authentication factor in authenticating the inbound call. If the JIP is not authenticated, the analytics server 102 evaluates whether the JIP should be authenticated using the CLLI and the JIP record.

The analytics server 102 evaluates whether the JIP should be authenticated by determining whether a number of unique CLLIs associated with the JIP in the JIP record satisfy a threshold. If the metadata did not include the CLLI, then analytics server 102 queries the analytics database 104 and/or the call center database 112 for a stored CLLI associated with the ANI of the inbound call. Additionally or alternatively, the analytics server 102 queries external database(s) for the CLLI associated with the ANI of the inbound call. If the metadata did include the CLLI, then the analytics server 102 may use the CLLI received in the metadata to determine whether the JIP should be authenticated. Additionally or alternatively, the analytics server 102 confirms authenticity of the CLLI received in the metadata by querying the analytics database 104, the call center database 112, and/or the external database for the CLLI associated with the ANI.

The analytics server 102 evaluates whether the JIP should be authenticated by determining whether a number of unique CLLIs associated with the JIP in the JIP record satisfy a threshold. The analytics server 102 compares the CLLI associated with the inbound call to the CLLIs stored in the JIP record. The analytic server 102 updates the JIP record with the CLLI associated with the inbound call if the CLLI associated with the inbound call is a unique CLLI associated with the JIP. A unique CLLI associated with the JIP is a CLLI that has not previously been associated with the JIP (e.g., a CLLI that is not stored in the JIP record). The analytics server 102 may update the JIP record with unique the CLLI and additionally increment a counter tracking a number of unique CLLIs. If the CLLI associated with the inbound call is already a CLLI associated with the JIP (e.g., the CLLI is not a unique CLLI associated with the JIP), then the analytics server may not update the JIP record (e.g., not increment the counter, not store the CLLI in the JIP record).

When the analytics server 102 updates the JIP record, the analytics server 102 updates the number of unique CLLIs associated with the JIP. The analytics server 102 compares the updated number of unique CLLIs to a threshold. As mentioned, the threshold may be a global threshold and/or a threshold for a particular region/call-center. If the number of unique CLLIs in the JIP record satisfy the threshold, the analytics server 102 determines that the JIP has been authenticated and the analytics server 102 assigns the JIP an authenticated authentication status. The analytics server 102 uses the JIP as an authentication factor in call authentication. If the number of unique CLLIS in the JIP record does not satisfy the threshold, the analytics server 102 may discard the JIP and/or determine the authentication status of the JIP.

There may be various degrees of authentication and corresponding authentication statuses associated with the JIP. For example, in some embodiments, the analytics server 102 may make a binary determination as to whether the JIP is authentic or not. The authentication status is therefore authenticated or not authenticated. In other embodiments, the analytics server 102 determines the authentication status or confidence score based on, for example, the number of unique CLLIS in the JIP record and the threshold. In a non-limiting example, the analytics server 102 may determine that the JIP is 60% authenticated if the JIP record indicates six unique CLLIs out of the threshold ten unique CLLIs required for authentication. A non-limiting example of the corresponding authentication status is 0.6. In these embodiments, the analytics server 102 may determine or assign a weighting factor (sometimes called a "weight" or "factor") for the JIP, which the analytics server 102 references to weigh the JIP as, for example, an authentication factor according to the authentication status of the JIP. For example, if the JIP is 60% authenticated, the analytics server 102 may weigh the JIP as an authentication factor only 60%. In this manner, the analytics server 102 uses the JIP as an authentication factor but does depend on the JIP because the JIP is still relatively unreliable. In these implementations, the analytics server 102 may weigh each of the other authentication factors 100% to distinguish the reliability of the JIP from other authentication factors.

As described herein, if the JIP is an authentic JIP, the analytics server 102 uses the JIP as an authentication factor in authenticating the call. The analytics server 102 determines authentication factors using additional information extracted from the call data. For example, authentication factors include extracted features from the audio signal of the inbound call (e.g., mel-frequency cepstrum coefficients (MFCCs)), behavior features of the caller during the call (e.g., an action taken during interaction with an IVR system, an amount of time elapsed between actions taken during interaction with an IVR system, providing incorrect information to an IVR system, a number of times a specific activity in an IVR was performed, a number of times an IVR was called during a measure of time, a volume or a duration of at least one dual-tone multi frequency (DTMF) tone during interaction with an IVR system, an amount of time elapsed between DTMF tones, a use of voice during interaction with an IVR system, an amount of time elapsed between a beginning of an IVR prompt and a caller's spoken response to the IVR prompt, or an amount of time elapsed between an IVR prompt and an action taken during interaction with an IVR system), velocity features of the call (e.g., a sequence of calls or attempted calls from at least one ANI similar to the inbound ANI, account identifiers, etc.), reputation features of the call (e.g., suspicious activity, malicious activity, a prior complaint, a device type, a carrier, a route taken by the call prior to entering a telephone exchange, a route taken by the call after leaving a telephone exchange, or a location) and the like.

In some cases, the analytics server 102 uses the JIP as a fraud risk factor and/or an authentication factor by inputting the JIP and the various other factors into the machine-learning architecture. In this way, the machine-learning architecture generates the fraud risk score or authentication score based upon the JIP (e.g., whether the JIP is likely for the CLLI or other type of metadata; whether the JIP is an authenticated JIP). Additionally or alternatively, the machine-learning architecture adjusts (e.g., increases or decreases) the risk score, authentication score, or a confidence score output of the machine-learning architecture based on the JIP (e.g., whether the JIP is an authenticated JIP; whether the JIP is likely for the CLLI or other type of metadata).

In some cases, the analytics server 102 uses an authenticated JIP as a fraud risk factor and/or an authentication factor input into the machine-learning architecture. The analytics server 102 applies the machine-learning model to generate a fraud probability (represented as the fraud risk score) indicating a predicted likelihood that the call is spoofed or otherwise fraudulent. Additionally or alternatively, the machine-learning model may generate an authentication probability or the fraud probability (represented as an authentication score or the fraud risk score) indicating the predicted likelihood that the call originated from a verified or expected calling device.

In operation, the analytics server 102 executes the software programming of the machine-learning architecture that apply layers of a trained machine-learning model on the risk or authentication factors associated with the inbound phone call. The operational layers of the machine-learning architecture apply one or more machine-learning models on the call data for inputted call data. When applying the machine-learning models, the operational layers execute any number of functions or machine-learning algorithms that implement any number of machine-learning techniques, such as Bayesian statistics, random forests, SVMs, neural networks, an ensemble model, or similar machine-learning techniques. An output of the machine-learning model includes one or more scores (e.g., risk score, authentication score, confidence score) for the inputted call data (e.g., training call data, enrollment call data, inbound call data) of the particular input call (e.g., training call, enrollment call, inbound call), which the layers of the machine-learning architecture calculated based upon the factors (e.g., risk factors, authentication factors) extracted from the call signaling data of the input call. The machine-learning architecture determines score result based upon weights assigned to each value of the factors according to the machine-learning model. Feeding call data, including signaling metadata, into the machine-learning architecture and determining a risk score from such inputs is further described in U.S. patent application No. '789 incorporated by reference.

The analytics server 102 determines whether the risk score or other scoring output (e.g., predicted authentication score) satisfy corresponding thresholds (e.g., risk threshold for predicting a likelihood of fraud risk detection; authentication threshold for predicting a likelihood that the caller or calling device 114 should be authenticated as a purported registered caller or registered calling device 114). The analytics server 102 calculates and evaluates the one or more outputted scores when applying the various statistical or operational layers (e.g., scoring layers, fully-connected layers, stat pooling layers) of the machine-learning architecture on the various types of signaling data or other types of call data. In evaluating the one or more outputted scores, the operational layers of the machine-learning architecture perform, for example, scoring functions, classifier functions, loss functions, or other types of functions of machine-learning techniques for determining a distance or level of similarity between the scores (e.g., risk score, authentication score) against corresponding thresholds (e.g., risk threshold, authentication threshold). User configuration inputs entered by an administrative user preconfigure one or more thresholds. Additionally or alternatively, the analytics server 102 dynamically determines one or more thresholds during training or in an ongoing manner (after training) at a given interval. As an example, the analytics server 102 adjusts the one or more threshold relative to a given target metric (e.g., false positive rate, false negative rate) and/or relative to a volume of available information associated with the calling ANI, the calling end-user device 114, or the caller.

The analytics server 102 need not generate an authentication score distinct from the risk score (or generate outputs based on such authentication score), in all embodiments. The analytics server 102 may use the risk score for authentication purposes. As an example, if the analytics server 102 determines that the risk score satisfies the risk threshold, then the analytics server 102 determines that the analytics server 102 has identified an authenticated inbound call. Likewise, if the analytics server 102 determines that the risk score fails to satisfy the risk threshold, then the analytics server 102 determines that the server has identified the current call is a spoofed call. In some implementations, after the determining the risk score satisfies the risk threshold, the analytics server 102 then proceeds to apply operational layers of the machine-learning architecture that generate the authentication score for the call and evaluate the authentication score against the corresponding authentication threshold.

In some embodiments, the analytics server 102 uses an authenticated JIP to boost a score result (e.g., risk score, authentication score) or the confidence score of the machine-learning architecture. The confidence score may be a separate output outputted by the machine-learning architecture or other function of the analytic server 102 indicating a level of confidence associated with the results generated by the machine-learning architecture. As an example, in some embodiments, the analytics server 102 boosts the risk score, authentication score, or confidence score by some preconfigured amount based on verifying the JIP as an authenticated JIP. As another example, in some embodiments, the analytics server 102 separately evaluates the inputted call data using the authenticated JIP by applying handcrafted algorithms on the call data using the authenticated JIP and/or by referencing preconfigured expected values (e.g., authenticated JIP) to generate, retrieve (from a database), or otherwise obtain confirmation results (e.g., confirmation risk score, confirmation authentication score). In this example embodiment, the analytics server 102 generates the confidence score based upon comparing a similarity or distance between the confirmation results of the separate evaluation functions against the scoring results generated by the analytics server 102 using the machine-learning architecture.

Structural Options. As mentioned, the machine-learning architecture includes software programming executed by the analytics server 102, where the software programming defines the layers or functions of the machine-learning architecture. The analytics server 102 executes the layers and functions of the machine-learning architecture in various operational phases, including a training phase, an optional enrollment phase, and a deployment phase (sometimes referred to as "testing" or "inference"). The analytics server 102 applies the machine-learning architecture on input data (e.g., training data, enrollment data, deployment data) for a given call (e.g., training call, enrollment call, inbound call) based upon the particular operational phase. The layers and functions of the machine-learning architecture comprise software programming that define various operational engines or sub-components of the machine-learning architecture, such as input layers, statistical layers, and output layers, among others.

The input layers perform various operations for ingesting input signaling data of calls, as fed by the analytics server 102 into the machine-learning architecture. These operations include, for example, performing various pre-processing operations or data augmentation operations. The pre-processing operations convert, scale, normalize, or otherwise arrange the input signaling data for the operational statistical layers of the machine-learning architecture. Non-limiting examples of the pre-processing operations include parsing or segmenting the signaling metadata, performing one or more transformation functions (e.g., FFT, SFT), extracting various types of feature sets from the input signaling data, and normalizing the signaling data, among other potential pre-processing operations. The data augmentation operations generate various types of simulated spoofed or degraded call data for training call data or enrollment call data, such that the operational statistical layers of the machine-learning architecture ingest and train the layers the machine-learning architecture using the resulting simulated training call data. In some cases, the analytics server 102 generates simulated training data corresponding to training calls having varied features or characteristics (e.g., spoofed metadata). The server generates an augmented copy dataset corresponding to the training calls. When the analytics server 102 applies a data augmentation operation on a particular call data, the analytics server 102 generates corresponding simulated call data as an augmented copy of the particular training call data of the training call.

The operational or statistical layers of the machine-learning architecture include the layers containing machine-learning models trained to perform the operations for determining a risk level or authenticating the caller using the signaling data according to the machine-learning techniques. The statistical layers may include various types of machine-learning models programmed (and trained) to implement machine-learning techniques that model certain types of information, such as a location model or risk likelihood model. These models may implement any number of machine-learning techniques (e.g., Bayesian model, random forest, neural network) performing a certain operational or statistical analysis for the given inputs, in accordance with the particular model's trainable weights, hyper-parameters, or connections. As an example, in some embodiments, a location model implements a machine-learning technique trained to predict the likelihood of receiving a purported JIP for a given CLLI or location. In some embodiments, the statistical layers implement a machine-learning model based upon an ensemble model defined by a plurality of constituent models trained to generate the predicted outcome in concert. As an example, the location model implements three constituent models, each of which implements a distinct machine-learning technique, and each trained to predict the likelihood of receiving the purported JIP for the given CLLI or location.

The output layers perform various functions for certain operational functions, preparing data for output, or training the machine-learning architecture. During the training phase and, during an optional enrollment phase, one or more fully-connected layers, classification layers, or other types of output layers generate predicted outputs (e.g., predicted scores, predicted classifications) for the training call data (or enrollment call data). Loss layers perform various types of loss functions to evaluate the distances (e.g., differences, similarities) between predicted outputs (e.g., predicted scores) to determine a level error between the predicted outputs and corresponding expected outputs indicated, for example, by training labels associated with the training or enrollment data. The loss layers, or other functions executed by the analytics server 102, tune or adjust the weights, connections, or hyper-parameters of the machine-learning architecture until the distances between the predicted outputs and the expected outputs satisfy a training threshold.

In some embodiments, during the optional enrollment phase, the analytics server 102 receives and stores enrollment call data from the enrollee user for the enrolled user device 114. The analytics server 102 may capture and store certain types of enrollment data (e.g., enrollment signaling metadata, enrolled caller demographic information) into one or more databases 104, 112 containing data records for registered enrollees and enrolled devices 114. The analytics server 102 captures or continuously updates the enrollment data by, for example, receiving user inputs indicating the enrollment data entered or otherwise provided (e.g., spoken via the IVR) from the enrollee user, parsing the enrollment signaling data from the enrollment call data, or retrieving certain enrollment data of the enrolled device 114 by querying various databases, such as the call center database 112, analytics database 104, or third-party database (not shown) containing publicly or commercially available telecommunications information, which may include a carrier database, the LERG database, or the like. During the later deployment phase, the analytics server 102 applies the trained machine-learning architecture on the inbound call data for the inbound call received at the call center system 110 or analytics system 101. The operational layers of the machine-learning architecture extract or obtain (e.g., from the database(s)) the inbound signaling metadata of the inbound call. The machine-learning architecture generates the risk score or the authentication score based upon a level of similarity (e.g., cosine distance) between the inbound call data and the enrollment call data.

Additionally or alternatively, in some embodiments, during the optional enrollment phase, the analytics server 102 applies the trained machine-learning architecture on enrollment call data for an enrollee user registered with the call center system 110 or analytics system 101. The operational layers of the machine-learning architecture extract an enrollment feature vector representing the enrollment signaling metadata of the particular enrollment call. The analytics server 102 then algorithmically combines the enrollment feature vectors to generate an enrolled deviceprint. During the later deployment phase, the analytics server 102 applies the trained machine-learning architecture on the inbound call data for the inbound call received at the call center system 110 or analytics system 101. The operational layers of the machine-learning architecture extract an inbound feature vector representing the inbound signaling metadata of the inbound call, which the analytics server 102 treats as the inbound deviceprint. The machine-learning architecture generates the risk score or the authentication score based upon a level of similarity (e.g., cosine distance) between the enrolled deviceprint compared against the inbound deviceprint.

As mentioned, the machine-learning architecture may include layers implementing a location model that determines and evaluates various types of location information associated with the inbound call. The machine-learning architecture feeds the output of the location model to one or more downstream operations of the machine-learning architecture. In some implementations, the machine-learning architecture feeds the output of the location model to the operational layers as risk factors or authentication factors for determining the risk score, authentication score, or confidence score. Additionally or alternatively, the machine-learning architecture adjusts the risk score, the authentication score, or confidence score using the output of the location model.

In operation, the location model uses various types of data (e.g., JIP, CLLI) indicating a caller's location to determine a fraud risk score and/or authentication score. For example, the location model may include any number of machine-learning techniques (e.g., Bayesian, random forest, SVM) for predicting a likely originating location from which the call originated; determining whether the predicted originating location is similar to an expected originating location; and outputting a fraud score, authentication score, or other type of score (e.g., location similarity score) based upon an amount of similarity, difference, or distance. If the output of the location model indicates a discrepancy (e.g., the similarity score is low), then the location model produces one or more scores (e.g., risk score, authentication score, location score) more likely to indicate predicted fraud and/or less likely to authenticate the caller.

The analytics server 102 performs any number of functions for obtaining (e.g., retrieving or generating) the expected originating location. The emulation system 102 may generate the expected originating location based upon any number of prior, historic call data for any number of calls associated with the particular JIP, CLLI, or other types of signaling metadata. As an example, the location model may, for example, determine one or more likely expected locations for the given JIP or CLLI prior to the inbound call, which the location model may reference using the signalizing metadata of the inbound call.

As another example, the analytics server 102 generates the expected call location(s) using historic location information of the particular caller or call device 114, which may be stored in one or more databases 104, 112. When the call originated from an expected originating location (i.e., a historic location for the caller), the location model generates an output more likely to authenticate the inbound call, verify the JIP, predict a caller-friendly risk score, and/or output a caller-friendly confidence score.

The analytics server 102 may separately evaluate the inbound call using the authenticated JIP by verifying other call data associated with the inbound call according to one or more tests. The test(s) may be binary tests based on authenticated JIPs and carriers/line types. For example, in a first test, the analytics server 102 may compare the carrier associated with the authenticated JIP to the carrier associated with the ANI. If the carrier associated with the authenticated JIP matches the carrier associated with the ANI, then the probability of a fraudulent inbound call decreases (e.g., the risk score decreases). In a second test, the analytics server 102 compares the line type associated with the JIP with the line type determined in the inbound call metadata. If the line type associated with the JIP matches the line type associated with the inbound call (e.g., the inbound call is delivered using a mobile phone and the carrier type associated with the JIP is associated with a mobile line), then the probability of a fraudulent inbound call decreases. In some embodiments, the analytics server 102 evaluates each test in a sequence such as a chain of tests. In other embodiments, the analytics server 102 evaluates each test is independently. The analytics server 102 algorithmically combines the risk score determined as a result of each test. The analytics server 102 may use the similarities or differences between expected device-type or line-types for a given predicted device-type or line-type for generating one or more scores, including generating the risk score, authentication score, or confidence score.

If the results determined by the analytics server 102 using the machine-learning architecture match the results determined by the analytics server 102 separately (e.g., the inbound call is authenticated or the inbound call is spoofed), the analytics server 102 boosts a confidence score or risk score of the results determined using the machine-learning architecture. If the results made by the analytics server 102 using the machine-learning architecture do not match the results made by the analytics server 102 separately, then the confidence score of the results determined using the machine-learning architecture may decrease, the analytics server 102 may raise a flag, or some combination.

In some implementations, the analytics server 102 may take certain actions based upon the calculated risk score. For example, if the risk score satisfies a certain risk threshold, the analytics server may determine that the current call is a fraudulent. For example, the analytics server 102 may generate a notification for display on a graphical user interface (GUI) of a computing device of an agent at a customer call center 110. The analytics server 102 may also end or reject the call, store the metadata for the call into one or more databases 104, 112, or forward the call to a fraud analyst for various remedial measures.

Figure 2:
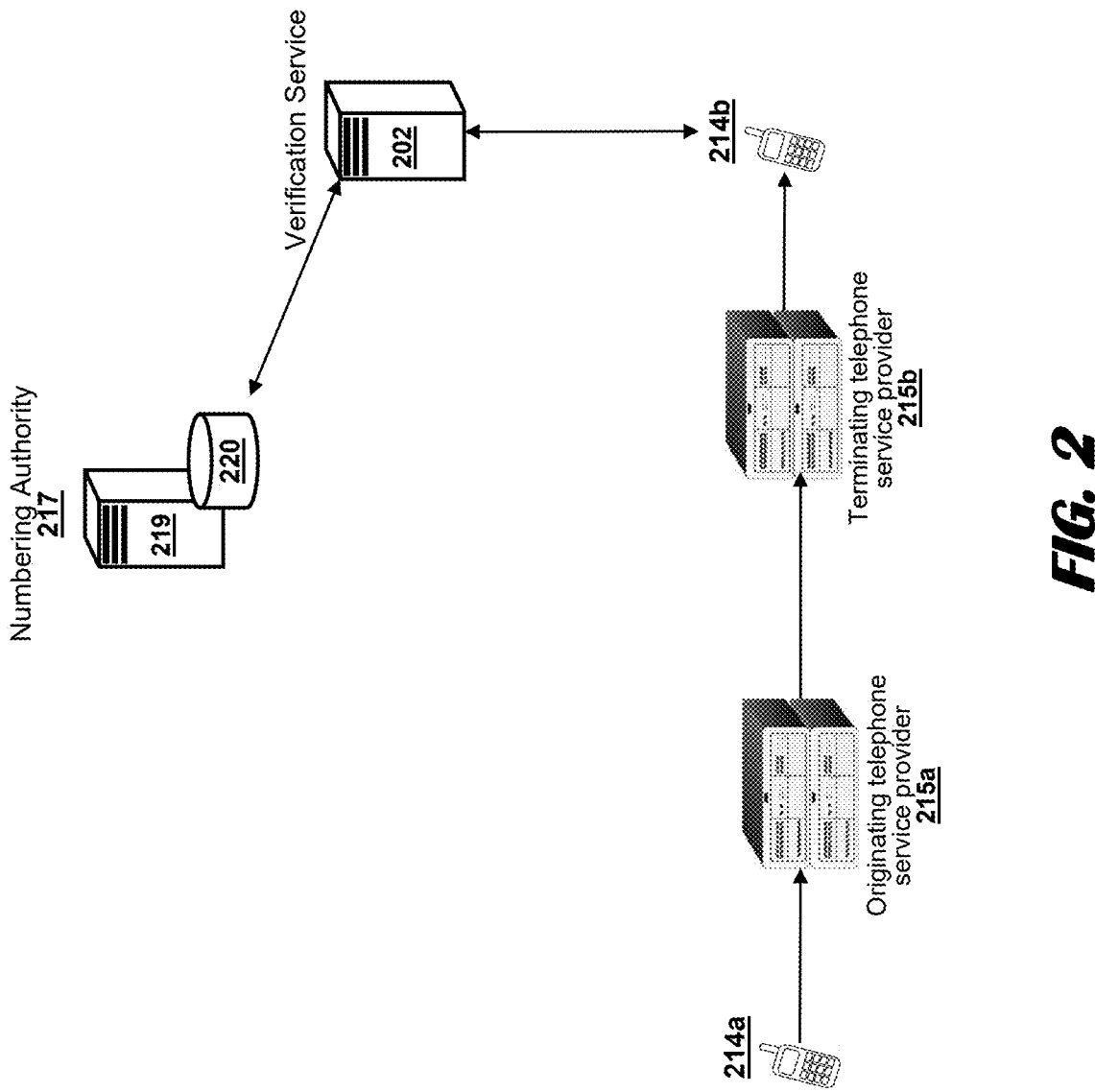
FIG. 2 shows a data flow of receiving and servicing inbound calls, according to an embodiment.

FIG. 2 is a diagram showing data flow of receiving and servicing inbound calls according to an embodiment. An initiated telephone call 214 includes the call initiated at 214a, and the call detected by a verification service 202 at 214b. One or more telephone service providers 215 (including the originating telephone service provider 215a and the terminating telephone service provider 215b) route the call 214 to a call center system. As described herein, each of the telephone service providers 215 may inject and/or alter metadata or other call data during the routing of the call 214.

The verification service 202 responsible for authenticating the call may receive the call at end-user device 214b after the call originating at end-user device 214a has been routed by one or more telephone service providers 215. The verification service 202 extracts call data including the ANI and the JIP. The verification service 202 extracts the CLLI from the call data if, for example, the terminating telephone service provider 215b injects the call data with CLLI metadata.

The verification service 202 performs an authentication operation to determine whether the extracted JIP is an authentic (or verified) JIP. For example, the verification service 202 compares the extracted JIP to JIPs stored in a JIP record. The verification service 202 first determines whether the extracted JIP matches a JIP stored in the JIP record. If there is a match, the verification service next determines the authentication status of the JIP based on the authentication status of the JIP stored in the JIP record. If the JIP stored in the JIP record has an authenticated authentication status, the verification service 202 uses the JIP as an authentication factor in determining whether the call at end-user device 214b is authentic. If the JIP stored in the JIP record does not have an authenticated authentication status, the verification service 202 determines whether the JIP should be authenticated based on the number of unique CLLIs associated with the JIP in the JIP record.

If the verification service 202 does not receive the CLLI as part of the call data (or if the verification service 202 is configured to confirm a received CLLI), the verification service 202 queries a third party entity such as numbering authority 217. The numbering authority 217 operates a server 219 and database 220 configured to store and map CLLIs, assigned carriers, assigned JIPs, and the like. For example, database 220 may be a local exchange routing guide (LERG). The verification service 202 receives from the server 219 the assigned CLLI associated with the JIP.

The verification service 202 determines whether the JIP should be authenticated by comparing the received CLLI to each of the CLLIs in the JIP record associated with the JIP extracted from the call at end-user device 214b. If the received CLLI is a unique CLLI (e.g., does not match the CLLIs in the JIP record), the verification service 202 increments a counter representing a number of unique CLLIs. If the counter satisfies a threshold, the verification service 202 determines that the JIP should be authenticated. If the JIP should be authenticated, the verification service 202 updates the authentication status of the JIP (e.g., from not-authenticated to authenticated), stores the updated authentication status, and uses the JIP as an authentication factor in determining whether the call at end-user device 214b is authentic. If the JIP should not be authenticated (e.g., the counter does not satisfy a threshold), then the verification service 202 may discard the JIP such that the JIP is not used as an authentication factor. Accordingly, the JIP is not ingested by subsequent authentication operations (e.g., layers of downstream machine-learning architectures, downstream layers of the machine-learning architecture) to determine the risk score of the inbound call. Additionally or alternatively, the verification service 202 weighs the JIP according to the authentication status of the JIP, where the authentication status of the JIP is based on the number of unique CLLIs and the threshold. As such, a JIP that is not authenticated may be used as a weighted authentication factor.

The verification service 202 feeds the authentication factors (including the authenticated/weighted JIP, signaling metadata, and other call data) as inputs into an authentication operation. The authentication operation may be a machine-learning architecture trained to determine a risk score using the authentication factors. The verification service 202 compares the risk score determined by the machine-learning architecture to one or more thresholds to determine whether the call at end-user device 214b is authentic.

FIG. 3 shows execution steps of a method 300 for authenticating an inbound call according to an embodiment. Embodiments may include additional, fewer, or different operations than those described in the method 300. A server performs the steps of the method 300 by executing machine-readable software code that includes one or more layers or functions of a machine-learning architecture, though it should be appreciated that any number of computing devices and/or processors may perform the various operations of the method 300.

In step 302, the server receives various forms of prior call data, including signaling metadata and other data (e.g., caller inputs, agent inputs) associated with prior calls originating from multiple calling devices (e.g., end-user devices 114). For example, the server receives JIPs as part of the signaling metadata associated with each of the prior calls and ANIs.

In step 304, the server identifies a CLLI associated with each of the prior calls using the ANI by querying a tele-communications database. In some embodiments, the server identifies the CLLIs associated with the ANIs by querying a local database. Additionally or alternatively, the server receives the CLLIs as part of the metadata signaling associated with the inbound call. Each time the server identifies a CLLI, the server stores the identified CLLI (and in some implementations, the associated ANI) in a JIP record correlating the identified CLLI to the JIP received in the signaling metadata in step 302. In some implementations, the server only stores the identified CLLI (and sometimes the associated ANI) in the JIP record if the identified CLLI is a unique CLLI.

In step 306, the server determines a number of unique CLLIs associated with each JIP in the JIP record. The server determines the number of unique CLLIs using the JIP record correlating identified CLLIs (e.g., in step 304) to the JIP received in the signaling metadata (e.g., in step 302). As mentioned, a unique CLLI associated with the JIP is a CLLI that has not previously been associated with the JIP. For example, a unique CLLI is a CLLI not stored in the JIP record. The server determines the number of unique CLLIs associated with the JIP by performing an authentication operation comparing the prior CLLIs (e.g., the CLLIs received in an inbound call) to the CLLIs stored in the JIP record. If the CLLI associated with the inbound call does not match any of the CLLIs stored in the JIP record, the server may add the CLLI associated with the inbound call to the JIP record and increment a counter. If the CLLI associated with the inbound call does match a CLLI already stored in the JIP record, the server does not add the CLLI to the JIP record and/or increment the counter.

In step 308, the server identifies a verified JIP in response to determining that the unique number of CLLIs associated with the JIP satisfies a threshold number of unique CLLIs. For example, the server compares the counter associated with each JIP to the threshold number of unique CLLIs. As mentioned, the threshold number of unique CLLIs may be a global threshold. The threshold number of unique CLLIS may also be a regional threshold (e.g., a threshold associated with a particular region, a threshold associated with a particular call center). The threshold may be user-determined (e.g., based on user experience, call center rules/guidelines) and/or determined via the server. The server indicates the verified JIP by setting a JIP authentication status (e.g., the JIP is authenticated, the JIP is not authenticated).

In step 310, the server executes an authentication operation for an inbound call using the JIP in the signaling metadata of the inbound call and the JIPs stored in the JIP record. In some embodiments, the server compares the JIP received in the inbound call to each of the JIPs in the JIP record. If the JIP received in the inbound call matches a JIP in the JIP record, the server determines the authentication status of the JIP received in the inbound call. If the JIP in the JIP record is verified, the server assigns the JIP received in the inbound call the same authentication status as the JIP in the JIP record (e.g., a verified JIP). If the JIP in the JIP record is not verified, the server determines whether the JIP received in the inbound call should be verified. The server determines that the JIP received in the inbound call should be verified by performing an authentication operation comparing the CLLIs associated with the JIP in the JIP record to the CLLI associated with the inbound call (e.g., step 306) and determining that a number of unique CLLIs satisfies a threshold (e.g., step 308). If the server determines that the JIP should be verified, the server assigns the JIP an authenticated authentication status. If the server determines that the JIP should not be verified, the server discards the JIP and/or weighs the JIP to determine an authentication status according to the number of unique CLLIs associated with the JIP.

The server subsequently uses the authentication status to perform subsequent authentication operation(s) to evaluate the authentication of the inbound call.

The authentication operation(s) may include applying one or more machine-learning architectures on the data associated with the inbound call including the signaling metadata and one or more authentication factors. In some embodiments, the machine-learning architecture is configured to extract authentication factors from the data associated with the inbound call. For example, the machine-learning architecture extracts authentication factors such as behavior features, reputation features, velocity features, etc. In other embodiments, the machine-learning architecture is configured to receive authentication factors. For instance, the machine-learning architecture receives JIPs and a corresponding authentication status, segmented audio samples, a device identifier (e.g., associated with the end-user device 114), caller information, etc. The machine-learning architecture(s) authenticate the call by determining a risk score associated with the inbound call. The server compares the risk score to one or more thresholds to determine whether the call is authentic.

In some embodiments, a computer-implemented method comprises receiving, by a computer, signaling metadata for a plurality of prior calls originated at a plurality of calling devices, the signaling metadata for each of the plurality of prior calls including an ANI and a JIP; identifying, by the computer, a CLLI associated with each ANI by querying a telecommunications database using the ANI; determining, by the computer, a number of unique CLLIs associated with each JIP in the signaling metadata of the plurality of prior calls; identifying, by the computer, a verified JIP in the signaling metadata of the plurality of prior calls in response to determining that the number of unique CLLIs associated with the verified JIP satisfies a threshold number of unique CLLIs; and executing, by the computer, an authentication operation for an inbound call, using the JIP in the signaling metadata of the inbound call and one or more verified JIPs stored in a database.

In some implementations, the method includes determining, by the computer, a risk score for the inbound call by executing one or more authentication operations using the signaling metadata for the inbound call.

In some implementations, executing the authentication operation includes applying, by the computer, a machine-learning architecture on the signaling metadata of the inbound call to authenticate the inbound call using the risk score.

In some implementations, the method includes generating, by the computer, an authentication status for the inbound call by executing the authentication operation using the JIP for the inbound call. The authentication status indicates that the JIP for the inbound call corresponds to at least one verified JIP in the database.

In some implementations, the method includes applying, by the computer, a machine-learning architecture to generate a risk indicator for the inbound call, in response to the computer determining that the JIP of the inbound call fails to match at least one verified JIP.

In some implementations, determining the number of unique CLLIs associated with each JIP in the signaling metadata of the plurality of prior calls includes: comparing, by the computer, the CLLI associated with each ANI to each CLLI in a JIP record associated with each JIP in the signaling metadata of the plurality of prior calls; and incrementing, by the computer, the number of unique CLLIs associated with each JIP in response to determining that the CLLI associated with the ANI does not match at least one CLLI in the JIP record.

In some implementations, the JIP record indicates one or more unique CLLIs.

In some implementations, the threshold number of unique CLLIs corresponds to a global threshold.

In some implementations, the threshold number of unique CLLIs corresponds to a regional threshold.

In some implementations, the method includes determining a weighting factor, by the computer, for the JIP in the signaling metadata according to an authentication status based on the number of unique CLLIs associated with the JIP in the signaling metadata and the threshold number of unique CLLIs.

In some embodiments, a system comprises a computer comprising a processor and a non-transitory machine-readable storage medium in communication with the computer configured to store data and machine-readable instructions for execution by the computer. The computer configured to receive signaling metadata for a plurality of prior calls originated at a plurality of calling devices, the signaling metadata for each of the plurality of prior calls including an ANI and a JIP; identify a CLLI associated with each ANI by querying a telecommunications database using the ANI; determine a number of unique CLLIs associated with each JIP in the signaling metadata of the plurality of prior calls; identify a verified JIP in the signaling metadata of the plurality of prior calls in response to determining that the number of unique CLLIs associated with the verified JIP satisfies a threshold number of unique CLLIs; and execute an authentication operation for an inbound call, using the JIP in the signaling metadata of the inbound call and one or more verified JIPs stored in a database.

In some implementations, the computer is further configured to determine a risk score for the inbound call by executing one or more authentication operations using the signaling metadata for the inbound call.

In some implementations, when executing the authentication operation, the computer is further configured to apply a machine-learning architecture on the signaling metadata of the inbound call to authenticate the inbound call using the risk score.

In some implementations, the computer is further configured to generate an authentication status for the inbound call by executing the authentication operation using the JIP for the inbound call. The authentication status indicates that the JIP for the inbound call corresponds to at least one verified JIP in the database.

In some implementations, the computer is further configured to apply a machine-learning architecture to generate a risk indicator for the inbound call, in response to the computer determining that the JIP of the inbound call fails to match at least one verified JIP In some implementations, when determining the number of unique CLLIs associated with each JIP, the computer is further configured to: compare the CLLI associated with each ANI to each CLLI in a JIP record associated with each JIP in the signaling metadata of the plurality of prior calls; and increment the number of unique CLLIs associated with each JIP in response to determining that the CLLI associated with the ANI does not match at least one CLLI in the JIP record.

In some implementations, the JIP record indicates one or more unique CLLIs.

In some implementations, the threshold number of unique CLLIs corresponds to a global threshold.

In some implementations, the threshold number of unique CLLIs corresponds to a regional threshold.

In some implementations, the computer is further configured to determine a weighting factor for the JIP in the signaling metadata according to an authentication status based on the number of unique CLLIs associated with the JIP in the signaling metadata and the threshold number of unique CLLIs.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium.

The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
receiving, by a computer, signaling metadata for a plurality of prior calls originated at a plurality of calling devices, the signaling metadata for each of the plurality of prior calls including an Automated Number Identification (ANI) and a Jurisdiction Information Parameter (JIP);
identifying, by the computer, a Common Language Location Identifier Code (CLLI) associated with each ANI by querying a telecommunications database using the ANI;
determining, by the computer, a number of unique CLLIs associated with each JIP in the signaling metadata of the plurality of prior calls;
identifying, by the computer, a verified JIP in the signaling metadata of the plurality of prior calls in response to determining that the number of unique CLLIs associated with the verified JIP satisfies a threshold number of unique CLLIs; and
executing, by the computer, an authentication operation for an inbound call, using an inbound JIP in inbound signaling metadata of the inbound call and one or more verified JIPs stored in a database.

2. The method according to claim 1, further comprising determining, by the computer, a risk score for the inbound call by executing one or more authentication operations using the inbound signaling metadata for the inbound call.

3. The method according to claim 2, wherein executing the authentication operation includes:
applying, by the computer, a machine-learning architecture on the inbound signaling metadata of the inbound call to authenticate the inbound call using the risk score.

4. The method according to claim 1, further comprising generating, by the computer, an authentication status for the inbound call by executing the authentication operation using the inbound JIP for the inbound call, the authentication status indicating that the inbound JIP for the inbound call corresponds to at least one verified JIP in the database.

5. The method according to claim 1, further comprising applying, by the computer, a machine-learning architecture to generate a risk indicator for the inbound call, in response to the computer determining that the inbound JIP of the inbound call fails to match at least one verified JIP.

6. The method according to claim 1, wherein determining the number of unique CLLIs associated with each JIP in the signaling metadata of the plurality of prior calls comprises:
comparing, by the computer, the CLLI associated with each ANI to each CLLI in a JIP record associated with each JIP in the signaling metadata of the plurality of prior calls; and
incrementing, by the computer, the number of unique CLLIs associated with each JIP in response to determining that the CLLI associated with the ANI does not match at least one CLLI in the JIP record.

7. The method according to claim 6, wherein the JIP record indicates one or more unique CLLIs.

8. The method according to claim 1, wherein the threshold number of unique CLLIs corresponds to a global threshold.

9. The method according to claim 1, wherein the threshold number of unique CLLIs corresponds to a regional threshold.

10. The method according to claim 1, further comprising determining a weighting factor, by the computer, for the JIP in the signaling metadata according to an authentication status based on the number of unique CLLIs associated with the JIP in the signaling metadata and the threshold number of unique CLLIs.

11. A system comprising:
a computer comprising a processor and configured to:
receive signaling metadata for a plurality of prior calls originated at a plurality of calling devices, the signaling metadata for each of the plurality of prior calls including an Automated Number Identifications (ANI) and a Jurisdiction Information Parameter (JIP);
identify a Common Language Location Identifier Code (CLLI) associated with each ANI by querying a telecommunications database using the ANI;
determine a number of unique CLLIs associated with each JIP in the signaling metadata of the plurality of prior calls;
identify a verified JIP in the signaling metadata of the plurality of prior calls in response to determining that the number of unique CLLIs associated with the verified JIP satisfies a threshold number of unique CLLIs; and
execute an authentication operation for an inbound call, using an inbound JIP in inbound signaling metadata of the inbound call and one or more verified JIPs stored in a database.

12. The system according to claim 11, wherein the computer is further configured to determine a risk score for the inbound call by executing one or more authentication operations using the inbound signaling metadata for the inbound call.

13. The system according to claim 12, wherein when executing the authentication operation the computer is further configured to:
apply a machine-learning architecture on the inbound signaling metadata of the inbound call to authenticate the inbound call using the risk score.

14. The system according to claim 11, wherein the computer is further configured to generate an authentication status for the inbound call by executing the authentication operation using the inbound JIP for the inbound call, the authentication status indicating that the inbound JIP for the inbound call corresponds to at least one verified JIP in the database.

15. The system according to claim 11, wherein the computer is further configured to apply a machine-learning architecture to generate a risk indicator for the inbound call, in response to the computer determining that the inbound JIP of the inbound call fails to match at least one verified JIP.

16. The system according to claim 11, wherein when determining the number of unique CLLIs associated with each JIP the computer is further configured to:

compare the CLLI associated with each ANI to each CLLI in a JIP record associated with each JIP in the signaling metadata of the plurality of prior calls; and increment the number of unique CLLIs associated with each JIP in response to determining that the CLLI associated with the ANI does not match at least one CLLI in the JIP record.

17. The system according to claim 16, wherein the JIP record indicates one or more unique CLLIs.

18. The system according to claim 11, wherein the threshold number of unique CLLIs corresponds to a global threshold.

19. The system according to claim 11, wherein the threshold number of unique CLLIs corresponds to a regional threshold.

20. The system according to claim 11, wherein the computer is further configured to determine a weighting factor for the JIP in the signaling metadata according to an authentication status based on the number of unique CLLIs associated with the JIP in the signaling metadata and the threshold number of unique CLLIs.

* * * * *